United States Patent
Ekbatani

(10) Patent No.: US 8,504,063 B2
(45) Date of Patent: Aug. 6, 2013

(54) ANONYMOUS DIRECTIONAL PEER-TO-PEER WIRELESS COMMUNICATION

(75) Inventor: Siavash Ekbatani, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 86 days.

(21) Appl. No.: 13/165,032

(22) Filed: Jun. 21, 2011

(65) Prior Publication Data

US 2012/0329473 A1    Dec. 27, 2012

(51) Int. Cl.
*H04B 1/00*    (2006.01)
*H04W 4/00*    (2009.01)

(52) U.S. Cl.
USPC ............... 455/456.1; 455/63.4; 370/334

(58) Field of Classification Search
USPC .. 370/328, 334, 339, 310; 342/359; 455/63.4, 455/456
See application file for complete search history.

(56) References Cited

U.S. PATENT DOCUMENTS

| | | | | |
|---|---|---|---|---|
| 5,231,634 | A * | 7/1993 | Giles et al. | 370/348 |
| 6,643,469 | B1 * | 11/2003 | Gfeller et al. | 398/162 |
| 2004/0246903 | A1 * | 12/2004 | Huang et al. | 370/247 |
| 2010/0172296 | A1 * | 7/2010 | Singh et al. | 370/328 |

* cited by examiner

*Primary Examiner* — Nizar Sivji
(74) *Attorney, Agent, or Firm* — Thomas|Horstemeyer, LLP.

(57) ABSTRACT

A method and system are provided in which a first device may directionally transmitting signals to a second device utilizing beamforming operations on multiple antennas. The first device may receive signals from the second device to establish an anonymous directional peer-to-peer wireless communication link with the second device. The transmitted signals may comprise a request-to-send (RTS) signal and the received signals may comprise a clear-to-send (CTS) signal. In some instances, the direction in which the transmitted signals are sent may be adjusted by changing the weights in the beamforming operation and/or by rotating the plurality of antennas. The transmitted signals may comprise an association identification (ID) corresponding to the first device, which may be embedded in a preamble or other portion of a frame structure. When the link is established, user information, such as profile information, for example, and/or messages may be sent from one device to the other.

17 Claims, 14 Drawing Sheets

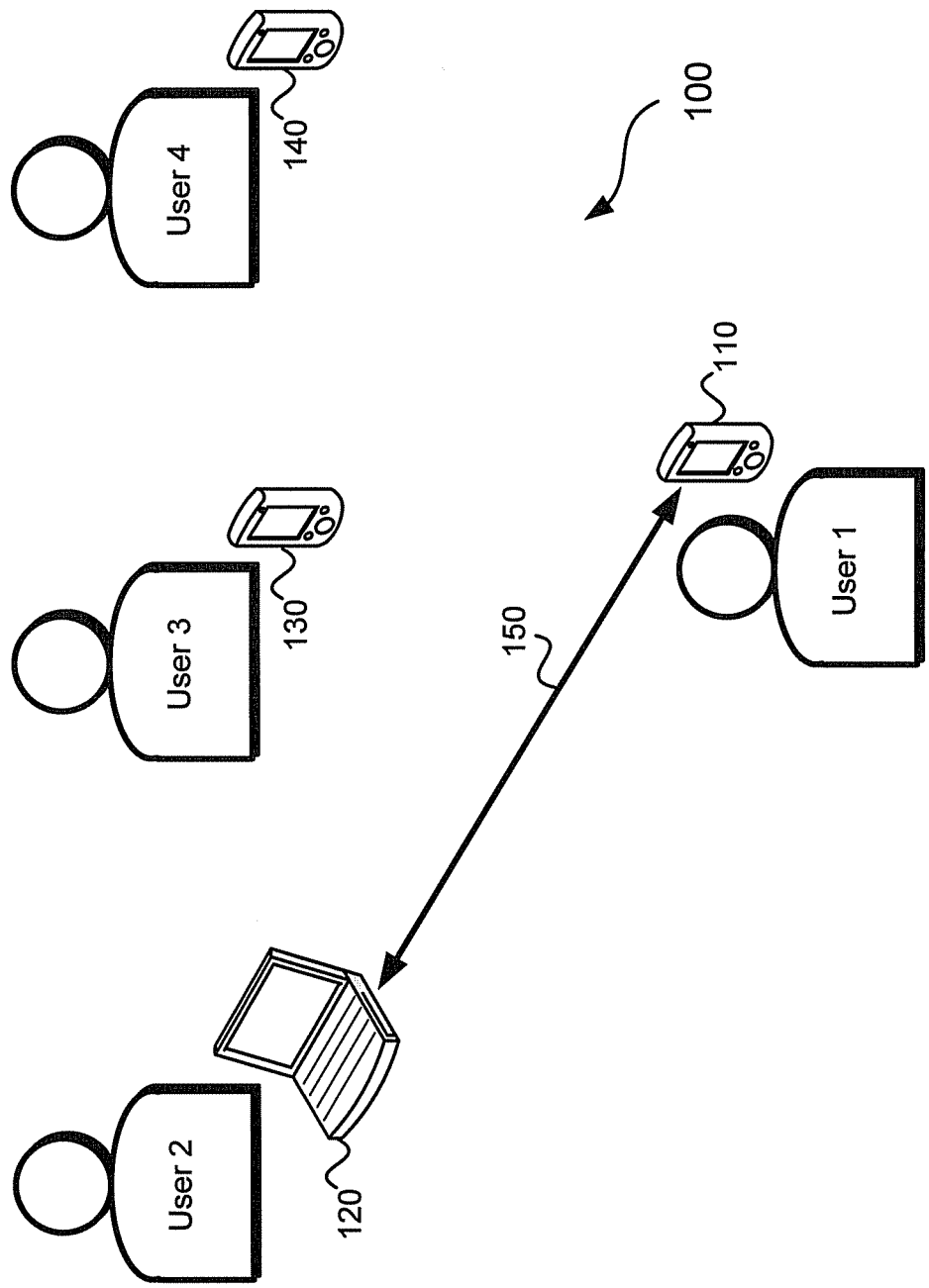

ANONYMOUS DIRECTIONAL PEER-TO-PEER WIRELESS COMMUNICATION

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to anonymous directional peer-to-peer wireless communication.

BACKGROUND OF THE INVENTION

When establishing a wireless communication link between any two devices, there may be different pairing methodologies by which the devices can be associated. For example, in personal area networks (PANs), the association may be made by presenting or displaying to a user a key-less entry list from which a remote device may be selected for communication. In local area networks (LANs), as another example, the association may be made by address words and/or corresponding network key information that is provided by a centralized unit to more than one device. There is a need, however, for other forms of device association to enable a wider range of usage models for peer-to-peer wireless communication.

Further limitations and disadvantages of conventional and traditional approaches will become apparent to one of skill in the art through comparison of such systems with the present invention as set forth in the remainder of the present application with reference to the drawings.

BRIEF SUMMARY OF THE INVENTION

A system and/or method for anonymous directional peer-to-peer wireless communication, as set forth more completely in the claims.

Various advantages, aspects and novel features of the present invention, as well as details of an illustrated embodiment thereof will be more fully understood from the following description and drawings. dr

BRIEF DESCRIPTION OF SEVERAL VIEWS OF THE DRAWINGS

FIGS. 1A and 1B are diagrams, each of which illustrates an exemplary scenario to establish an anonymous directional peer-to-peer wireless communication link, in accordance with embodiments of the invention.

DETAILED DESCRIPTION OF THE INVENTION

Figure 1A:
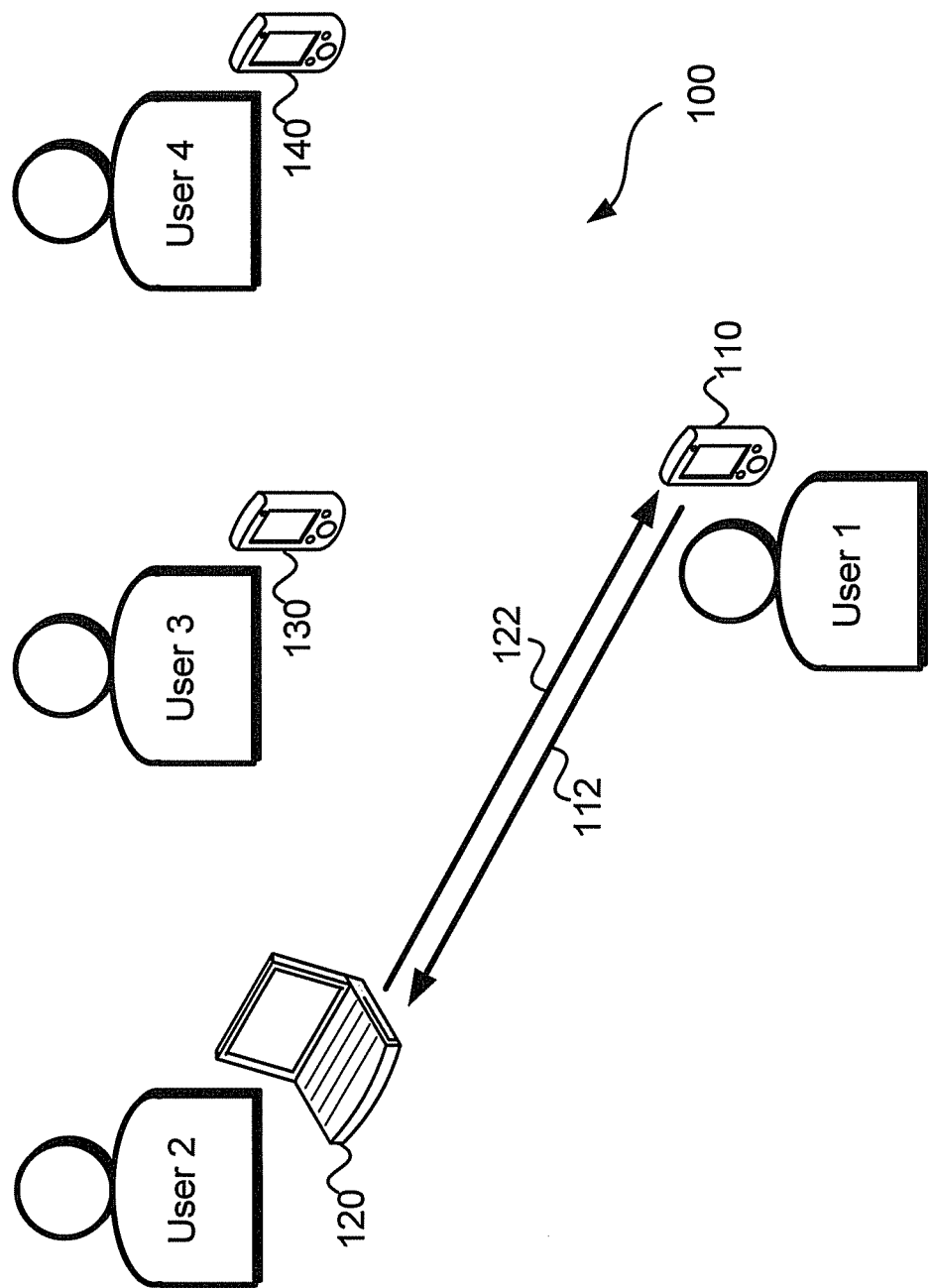

Certain embodiments of the invention can be found in a method and system for anonymous directional peer-to-peer wireless communication. In accordance with various embodiments of the invention, an initiator device may directionally transmit signals to a recipient device utilizing beamforming signal processing operations on a plurality of antennas. The initiator device may also receive signals from the recipient device to establish an anonymous directional peer-to-peer wireless communication link with the recipient device by associating the initiator device and the recipient device. The transmitted signals may comprise a request-to-send (RTS) signal or other like signal, while the received signals may comprise a clear-to-send (CTS) signal or other like signal. In some instances, the direction of the transmitted signals may be adjusted by changing the weights in the beamforming signal processing operations and/or by rotating the plurality of antennas. The transmitted signals may comprise an association identification (ID) corresponding to the initiator device, which may be embedded in a preamble and/or in some other portion of a standard frame structure. Once the link is established, user information, such as profile information and/or messages, for example, may be sent from one device to the other.

In another embodiment of the invention, a recipient device may receive signals from one or more initiator devices requesting that an anonymous directional peer-to-peer wireless communication link be established. The recipient device may determine a direction associated with the transmitted signals from each of the one or more initiator devices. For example, the recipient device may utilize beamforming signal processing operations on multiple antennas and/or other techniques to detect the direction of the incoming signals from the initiator devices. The recipient device may then transmit signals in the direction of one of the initiator devices to establish the anonymous directional peer-to-peer wireless communication link with that particular initiator device. The signals received by the recipient device from the various initiator devices may comprise an RTS signal or other like signal, while the signals transmitted by the recipient device may comprise a CTS signal or other like signal. Once the link is established, user information, such as profile information, for example, and/or messages may be sent from one device to the other.

When multiple initiator devices are present, the recipient device may receive an input to select the initiator device with which the anonymous directional peer-to-peer wireless communication link is to be established. The input may be provided by a user when presented with various choices of initiator devices with which to communicate. The recipient device may be operable to select more than one initiator device and, consequently, establish more than one separate and independent anonymous peer-to-peer communication link.

In some instances, the recipient device may be operable to transmit beacon signals to indicate its location and/or availability. The recipient device may sweep through a plurality of spatial segments or sectors utilizing one or more beacon signals per segment. In this manner, the initiator devices that are located in the sweeping region may be made aware of the presence and/or direction of a possible recipient device.

In accordance with various embodiments of the invention, having devices communicate with each other without the need for a centralized network and based on an anonymous and directional pairing methodology, a wide range of usage models or scenarios may be supported. Various aspects, details, and features of peer-to-peer wireless communication between anonymous devices via a directional association are provided below.

FIGS. 1A and 1B are diagrams, each of which illustrates an exemplary scenario to establish an anonymous directional peer-to-peer wireless communication link, in accordance with embodiments of the invention. Referring to FIG. 1A, there is shown a scenario in which a first user (User 1) is in an area 100 (e.g., room, conference hall, public space) with a second user (User 2), a third user (User 3), and a fourth user (User 4). The various users need not know each other and may be actively or passively participating in an event, for example a conference, which is taking place in the area 100.

User 1 may decide to communicate with User 2 as a way of introduction, to send a message, to transfer and/or receive certain type of information, or for some other reason. User 1 may utilize a device 110 to communicate with a device 120 of User 2. To start the engagement process, User 1 may point the device 110 in the direction of the device 120. At this stage, User 1 may provide an input to the device 110 so that the device 110 may start the transmission of one or more signals 112 in the direction of the device 120. The transmission of signals 112 may be confined to a narrow spatial resolution in the direction of the device 120 so that a device 130 and a device 140 of User 3 and User 4, respectively, do not receive the signals transmitted by the device 110. Such a directional spatial resolution or spatial selectivity may be achieved by using beamforming signal processing operations on multiple transmit antennas (e.g., antenna arrays) in the device 110 and/or by mechanically rotating the multiple transmit antennas in the device 110.

The signals 112 may comprise, for example, one or more frames that may include a request to establish a communication link and/or information about the device 110 such as an association ID. The association ID may enable identification of the device 110 for purposes of association or pairing while maintaining its anonymity. The request and/or the device information may be embedded in a preamble and/or in some other portion of a frame structure suitable for handshaking operations associated with establishing an anonymous directional peer-to-peer wireless communication link. Since the device 110 initiates the handshaking operations for establishing a communication link with the device 120, device 110 may be referred to as an "initiator device" or simply an "initiator." The device 110 may be also be referred to as an "active node" or "active peer" since it initiates the handshaking without any input from the device 120. On the other hand, device 120 may be referred to as a "recipient device" or simply a "recipient" since it receives the initial request to establish a communication link from the device 110. The device 120 may also be referred to as a "passive node" or "passive peer" since it simply waits to be contacted by an initiator device.

The device 120 may receive the signals 112 transmitted by the device 110 and may detect the direction of transmission of the received signals. In this regard, the device 120 may utilize beamforming signal processing operations on multiple receive antennas and/or other techniques, such as virtual antennas, for example, to detect the direction of arrival of the signals 112. In response to the signals received, the device 120 may transmit one or more signals 122 in the direction of the device 110. The transmission of signals 122, like that of the signals 112, may be confined to a narrow spatial resolution in the direction of device 110 so that only the device 110 receives the signals 122. Such a directional spatial resolution or directional selectivity may be obtained by using beamforming signal processing operations on multiple transmit antennas in the device 120 and/or by mechanically rotating the multiple transmit antennas in the device 120. The signals 122 may comprise, for example, one or more frames that indicate that it is clear to send information to complete the handshaking operations and/or include information about the device 120.

With respect to FIG. 1B, there is shown the anonymous directional peer-to-peer wireless communication link 150 between the device 110 and the device 120 established once the handshaking operations between the devices has been completed. At this stage, the device 110 may be utilized by User 1 to send a message to the device 120 in order to communicate the message to User 2. Instead of sending messages, or in addition to sending messages, User 1 and User 2 may share profile information and/or other type of information that may be relevant to the communication taking place between the two users. Either user may terminate or disable the link 150 once it is no longer needed. In this regard, either user may provide an input to their corresponding device to terminate or disable the link 150. Moreover, the link 150 may be automatically terminated or disabled for lack of activity and/or when a programmable timer associated in either device expires.

The anonymous and directional pairing methodology described above may be utilized with a wide range of devices. The type of devices that may be utilized include those that support transmission and/or reception of signals using beamforming signal processing operations on multiple antennas. The type of devices that may be utilized include those that are operable to provide wireless communication in unlicensed frequency bands, such as the 2.4 gigahertz (GHz), the 5 GHz, and/or the 60 GHz frequency bands, for example. These types of devices may enable peer-to-peer communication links with a maximum range of approximately 30 meters to approximately 60 meters. Examples of the types of devices that may be utilized for establishing anonymous directional peer-to-peer wireless communication links are devices that support Wireless Gigabit Alliance (WiGig) technologies and Wi-Fi Alliance technologies.

Figure 2A:
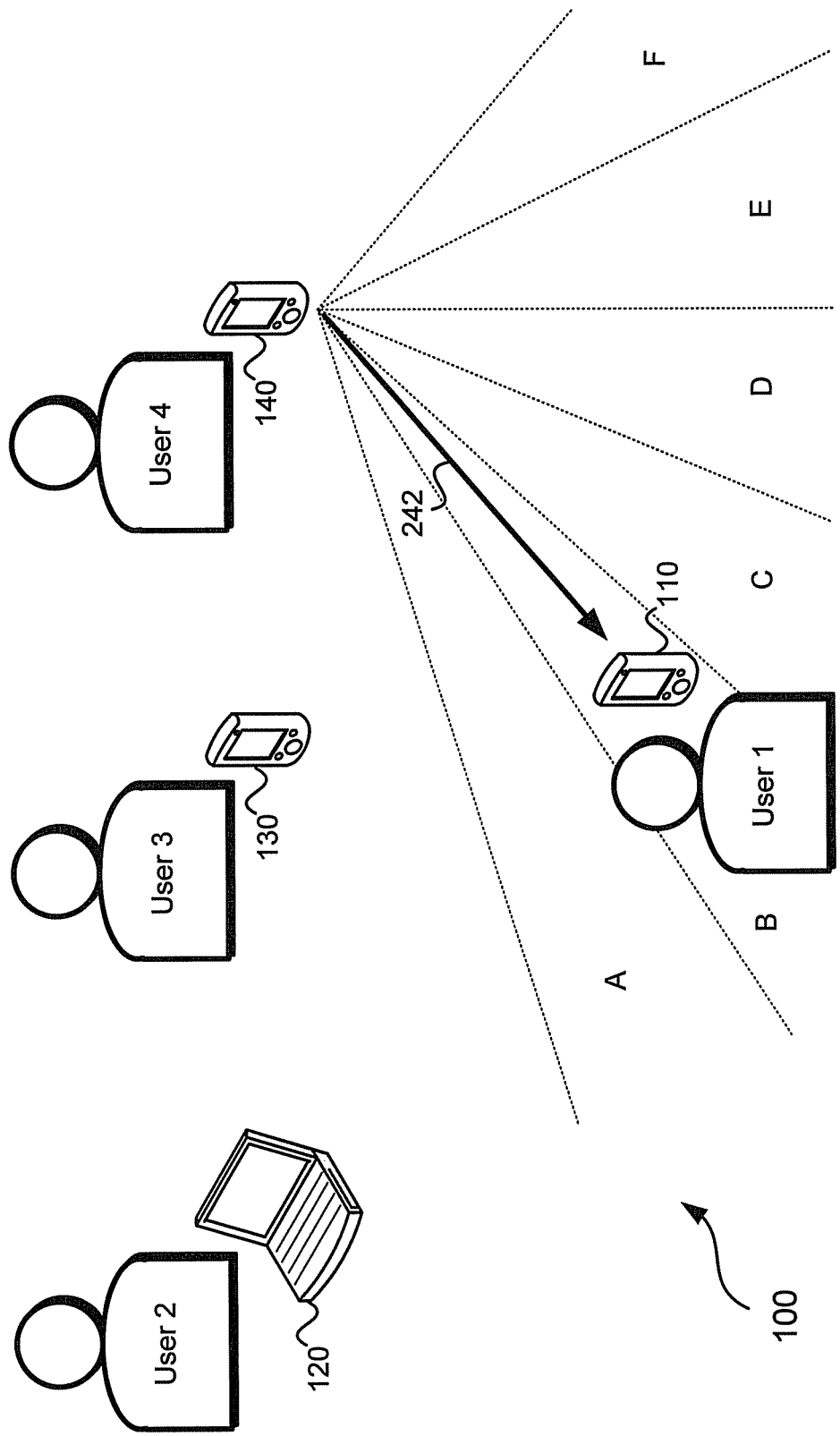
FIGS. 2A-2C are diagrams, each of which illustrates an exemplary scenario in which a spatial segment sweeping mechanism is utilized for establishing an anonymous directional peer-to-peer wireless communication link, in accordance with embodiments of the invention.
Figure 2B:
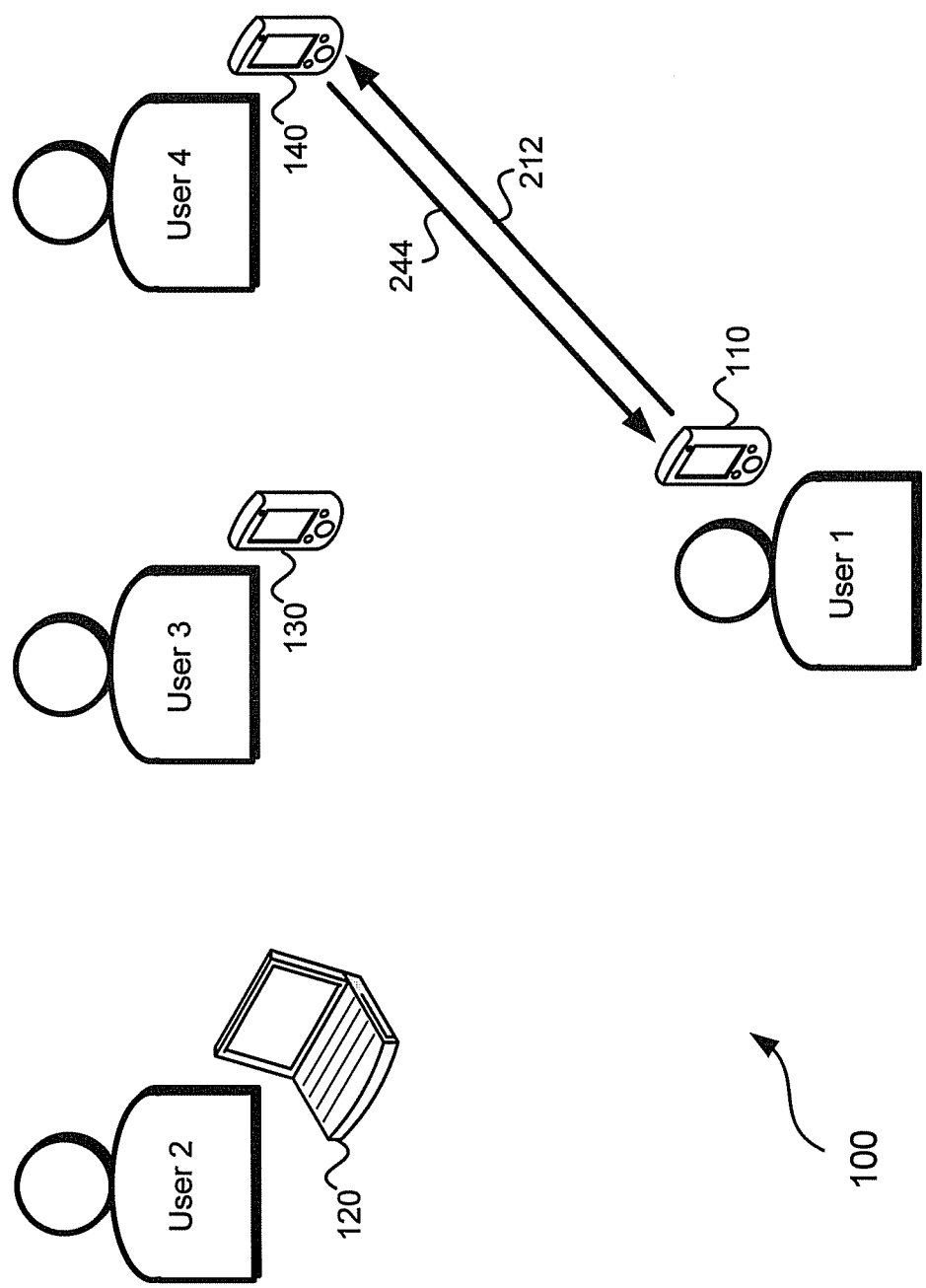
Figure 2C:
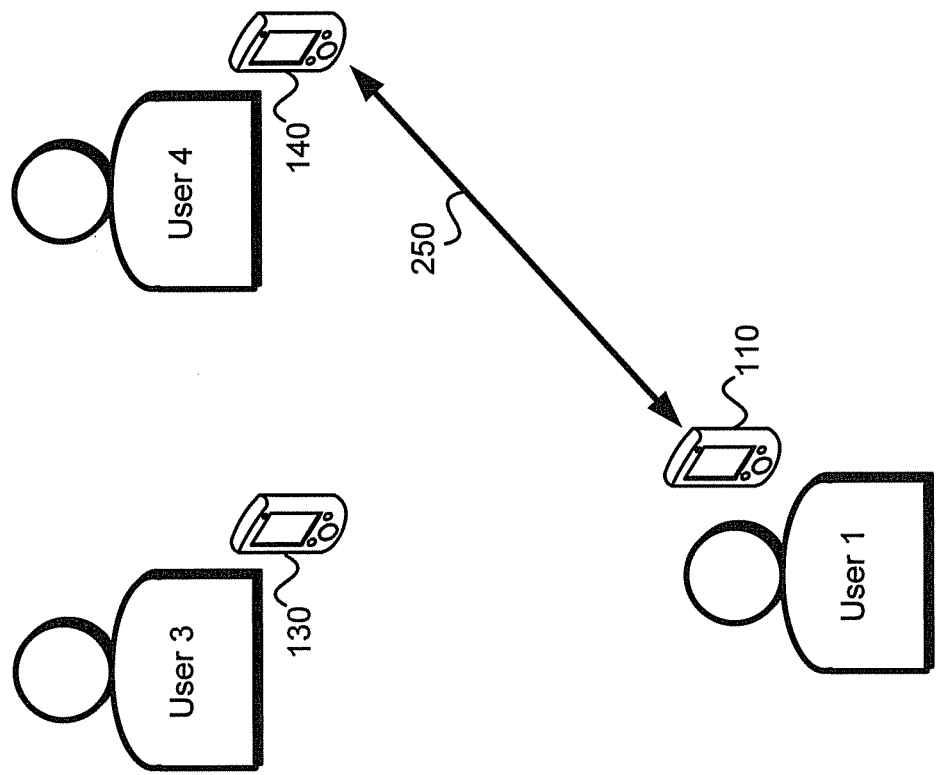
Figure 2C:
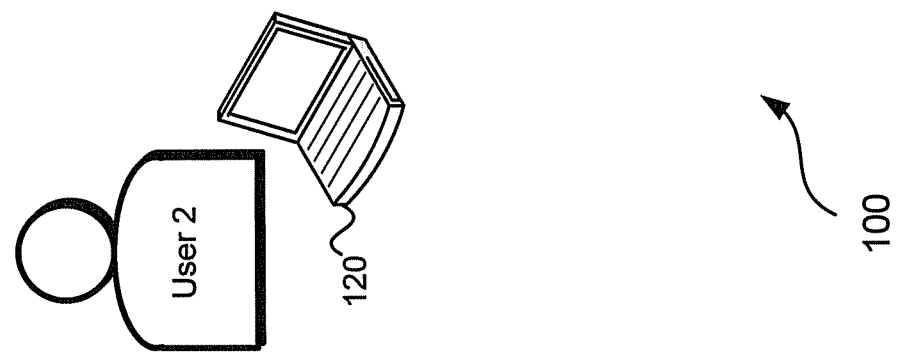

FIGS. 2A-2C are diagrams, each of which illustrates an exemplary scenario in which a spatial segment sweeping mechanism is utilized for establishing an anonymous directional peer-to-peer wireless communication link, in accordance with embodiments of the invention. Referring to FIG. 2A, there is shown the area 100 with Users 1, 2, 3, and 4 and the devices 110, 120, 130, and 140 as described above with respect to FIGS. 1A and 1B. In this scenario, the device 140 of User 4 may operate as an "active node" or "active peer" by sending beacon signals 242 over one or more spatial segments. The beacon signals 242 may be utilized to indicate the location and/or the direction of the device 140 and/or to indicate that the device 140 is available for anonymous directional peer-to-peer wireless communication.

As shown in the scenario of FIG. 2A, the device 140 may employ a sweeping mechanism that enables it to cover a wide area. The sweeping mechanism allows the device 140 to send one or more beacon signals 242 in each of multiple spatial segments A-F. These spatial segments may also be referred to as spatial sectors, for example. The number of spatial segments, the resolution of each spatial segment (e.g., angle), the number of beacon signals 242 that are sent in each spatial segment, and/or the timing of the transmission of the beacon signals 242 in each spatial segment may be programmed into the device 140 and may be dynamically modified based on the operation of the device 140. While spatial segments A-F are shown in FIG. 2A for purposes of illustration, the invention need not be so limited. More or fewer spatial segments may be utilized, each of which may have a specified spatial resolution. For example, WiGig devices may support 16 equal spatial segments or sectors, each having a spatial resolution of 22.5 degrees.

The device 140 may transmit the beacon signals 242 in a particular spatial segment by utilizing beamforming signal processing operations on multiple transmit antennas and/or by mechanically rotating the multiple transmit antennas to point in the direction of the spatial segment. As shown in FIG. 2A, the device 110 of User 1 may receive the beacon signals 242 from the device 140 when the signals are transmitted in the spatial segment B. Accordingly, the device 110 may detect the direction of arrival of the beacon signals 242 from the device 140 and the availability of the device 140 as a recipient device for establishing a peer-to-peer communication link.

Referring to FIG. 2B, User 1 may decide to communicate with User 4 once it is known that the device 140 of User 4 is available or ready for anonymous directional peer-to-peer wireless communication. For example, User 1 may be presented with information regarding the availability of the device 140 as a recipient device. Such information may comprise and/or may be based on the direction and/or strength (e.g., signal-to-noise ratio) of the beacon signals 242 transmitted by the device 140. User 1 may initiate the communication process by pointing the device 110 in the direction of the device 140. At this stage, User 1 may provide an input to the device 110 so that the device 110 may start the transmission of one or more signals 212 in the direction of the device 140. The signals 212 may be substantially similar to the signals 112 described above. For example, the signals 212 may comprise an association ID corresponding to the device 110. The signals 212 may be transmitted using similar techniques as those described above to transmit the signals 112.

The device 140 may receive the signals 212 transmitted by the device 110 and may detect the direction of arrival of the signals 212. In this regard, the device 140 may detect the direction of the received signals in a manner similar to that described above with respect to the device 120. In response to the signals received, the device 140 may transmit one or more signals 244 in the direction of the device 110 utilizing beamforming signal processing operations on multiple transmit antennas and/or by mechanically rotating the multiple transmit antennas. The signals 244 may comprise, for example, one or more frames that indicate that it is clear to send information to complete the handshaking operations and/or include information about the device 140.

With respect to FIG. 2C, there is shown the anonymous directional peer-to-peer wireless communication link 250 between the device 110 and the device 140 that is established after the handshaking operations are completed. At this stage, the device 110 may be utilized by User 1 to send a message, profile information, and/or other type of information to the device 140 of User 4. Either user may terminate or disable the link 250 once it is no longer needed. In this regard, either user may provide an input to their corresponding device to terminate or disable the link 250. Moreover, the link 250 may be automatically terminated or disabled for lack of activity and/or when a programmable timer associated in either device expires.

Figure 3A:
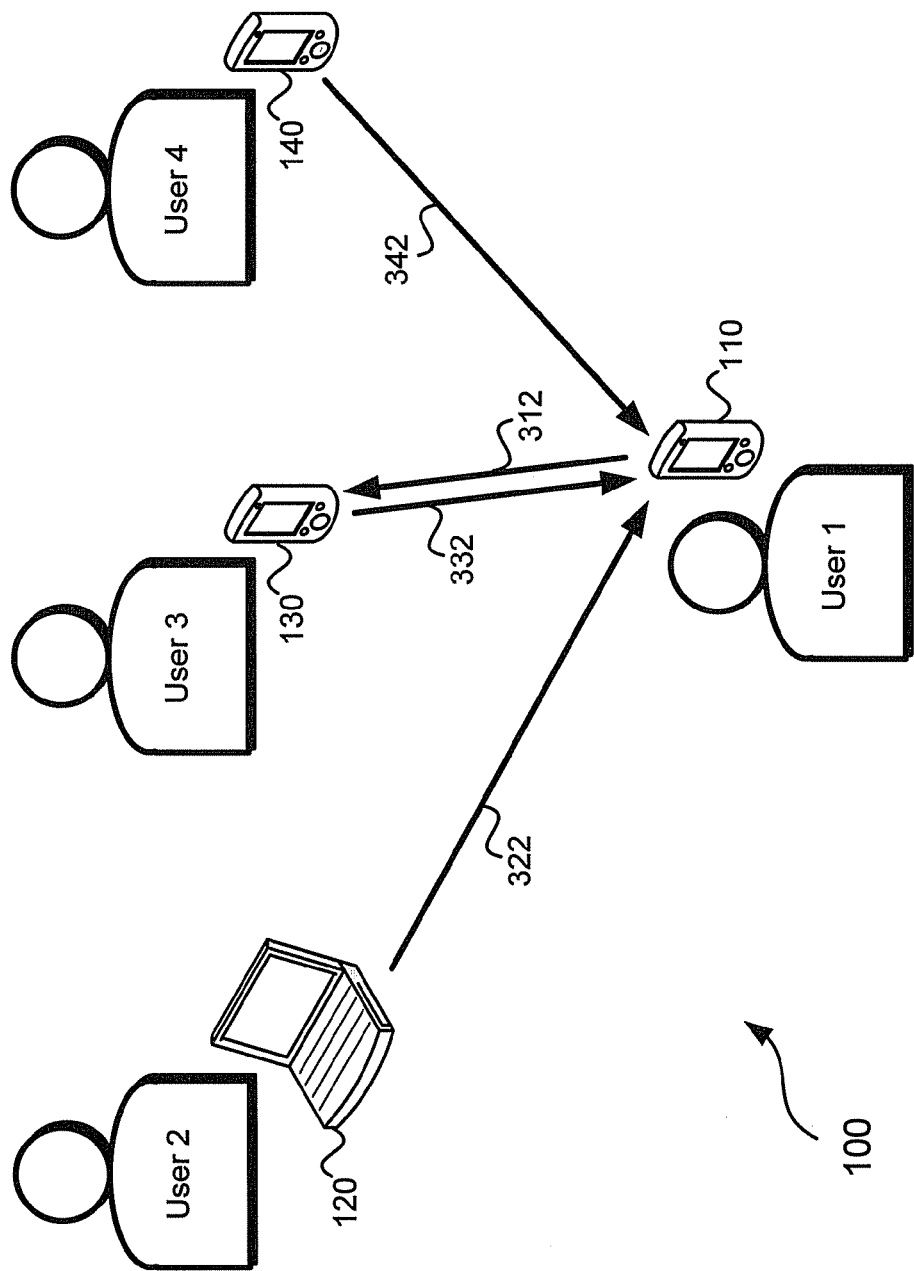
FIGS. 3A and 3B are diagrams, each of which illustrates an exemplary scenario in which device selection is utilized for establishing an anonymous directional peer-to-peer wireless communication link, in accordance with embodiments of the invention.
Figure 3B:
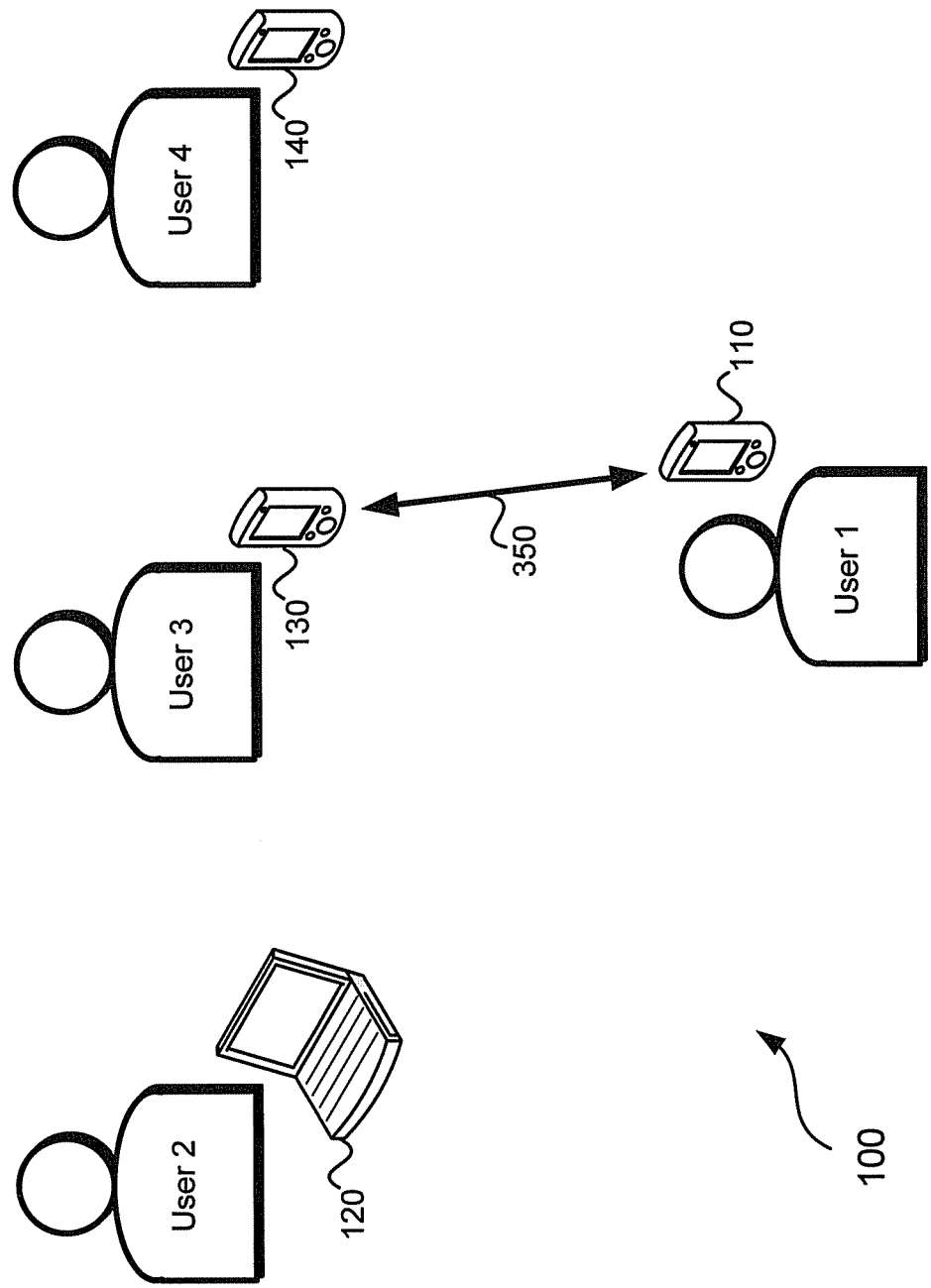

FIGS. 3A and 3B are diagrams that illustrate an exemplary scenario in which device selection is utilized for establishing an anonymous directional peer-to-peer wireless communication link, in accordance with embodiments of the invention. Referring to FIG. 3A, there is shown the area 100 with Users 1, 2, 3, and 4 and the devices 110, 120, 130, and 140 as described above with respect to FIGS. 1A and 1B. In this scenario, more than one user may decide to communicate with User 1. For example, User 2, 3, and 4 may decide to communicate with User 1 as a way of introduction, to send a message, to transfer and/or receive certain type of information, or for some other reason. User 2 may utilize the device 120 to communicate with the device 110 of User 1. Similarly, User 3 and User 4 may utilize the device 130 and the device 140, respectively, to communicate with the device 110 of User 1. To start the process, Users 2, 3, and 4 may point their respective devices in the direction of the device 110. At this stage, Users 2, 3, and 4 may provide an input to their respective devices so that the devices may start the transmission of one or more signals in the direction of the device 110. For example, the device 120 may transmit one or more signals 322, the device 130 may transmit one or more signals 332, and the device 140 may transmit one or more signals 342. The signals 322, 332, and 342 may be confined to a narrow spatial resolution in the direction of the device 110. Such a directional spatial resolution or spatial selectivity may be achieved by using beamforming signal processing operations on multiple transmit antennas and/or by mechanically rotating the multiple transmit antennas. The signals 322, 332, and 342 may be substantially similar to the signals 112 described above. For example, the signals 322, 332, and 342 may comprise an association ID corresponding to their respective devices. The signals 322, 332, and 342 may be transmitted using similar techniques as those described above to transmit the signals 112.

The device 110 may receive the signals 322, 332, and 342 and may detect the direction of arrival of each of those signals. In this regard, the device 110 may detect the direction of the received signals in a manner similar to that described above with respect to the device 120. In response to the signals received, the device 110 may present or display, visually and/or aurally, information associated with each of those signals to User 1. For example, the device 110 may present or display information such as direction, signal strength, and/or association ID for each of the initiator devices detected by the device 110. User 1 may provide an input to the device 110 to have one of the initiator devices select and to have the device 110. In this example, the device 130 of User 3 is selected. Accordingly, the device 110 may transmit one or more signals 312 in the direction of the device 130 utilizing beamforming signal processing operations on multiple transmit antennas and/or by mechanically rotating the multiple transmit antennas. The signals 312 may comprise, for example, one or more frames that indicate that it is clear to send information to complete the handshaking operations and/or include information about the device 110.

With respect to FIG. 3B, there is shown the anonymous directional peer-to-peer wireless communication link 350 between the device 110 and the device 130 that is established after the handshaking operations are completed. At this stage, the device 130 may be utilized by User 3 to send a message, profile information, and/or other type of information to the device 110 of User 1. Either user may terminate or disable the link 350 once it is no longer needed. In this regard, either user may provide an input to their corresponding device to terminate or disable the link 350. Moreover, the link 350 may be automatically terminated or disabled for lack of activity and/or when a programmable timer associated in either device expires.

The examples described above with respect to the scenarios of FIGS. 1A-3B are provided by way of illustration and not of limitation. Other scenarios may be supported in which an anonymous directional peer-to-peer wireless communication link may be established. Moreover, an anonymous directional peer-to-peer wireless communication link may be established in a wide range of situations to enable flexible usage models. For example, in social networking situations, a person may use his/her device to anonymously approach (e.g., introduction) another person in the room through that other person's device by associating the two devices using anonymous directional peer-to-peer wireless communication. Such a scenario may occur when the person entering the room may be interested in approaching other individuals but may not be aware of the current circumstances or dynamics of the gathering and whether it is appropriate to directly approach any one person. Accordingly, anonymous directional peer-to-peer wireless communication may be used to replace face-to-face contact and may also be applicable to social acquaintances. Through a directional correspondence based on the figurative looks of an individual, other characteristics can be accessed or revealed. For example, physical appearance may be encrypted in an identification code or association ID and access to the personal profile may be allowed once communication is established. In addition, it may be possible to publicize and/or read personal and/or professional profiles of individuals within a room. Moreover, scalable and/or layered secure association may be achieved by selecting different security and/or encryption mechanisms to use when transferring data through an anonymous directional peer-to-peer wireless communication link.

Other examples include, during a speech, the speaker may be asked a question or attention may be raised to a particular point without previous knowledge of the code of the speaker's device. In another example, during a meeting of representatives from multiple entities, a member of one of the entities may send a message to a member of another entity across the table. In another example, a team of lawyers and/or their client may communicate with each other as needed while in a meeting or in a courtroom. In another example, notes can be passed between members of a political team during a campaign event. Anonymous voting or poling may be performed utilizing directional peer-to-peer wireless communication.

Additional examples of situations in which anonymous directional peer-to-peer wireless communication may be utilized include military applications, such as messaging in the battlefield, group gaming or entertainment between previously unknown users, notification of criminal activity or other types of alarms, transport payments (e.g., toll road, public transport, parking), locating valuable assets that have been equipped with an appropriate transceiver, and any kind of scanning operation (e.g., hospitals, prisons, private buildings) in which a simplified and non-centralized system may prove more efficient to operate.

In yet another example, anonymous directional peer-to-peer wireless communication may be utilized in traffic control scenarios such as to request a green light or a pedestrian crossing light in a traffic intersection. In this regard, a user may point his/her device to another device placed on a pole (e.g., nearby the pedestrian crossing buttons) or on the traffic lights to establish the connection and make the request. In some instances, while at an intersection, a person in a vehicle may request a green light and the traffic light may decide to give a green light to the most crowded intersection. The invention need not be so limited and different types of requests may be made to facilitate or enable pedestrian crossing and/or vehicle traffic.

Figure 4:
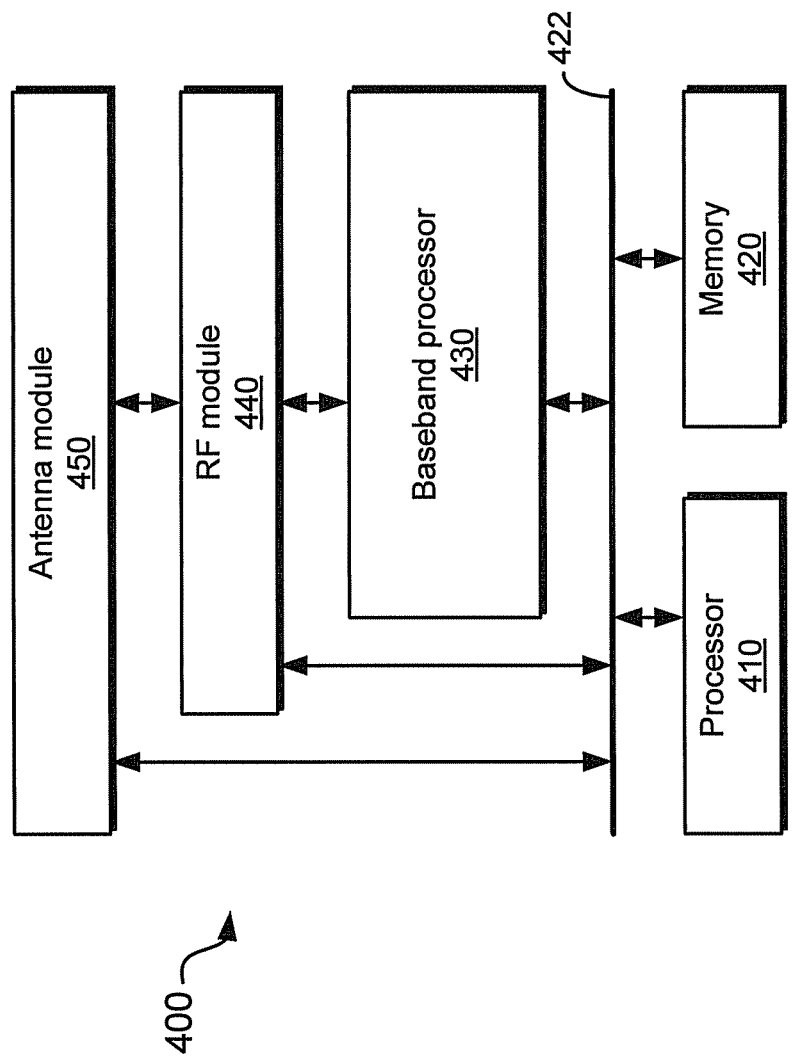
FIG. 4 is a block diagram of a device that is operable for anonymous directional peer-to-peer wireless communication, in accordance with an embodiment of the invention.

FIG. 4 is a block diagram of a device that is operable for anonymous directional peer-to-peer wireless communication, in accordance with an embodiment of the invention. Referring to FIG. 4, there is shown an architecture for a device 400 that may comprise a processor 410, a memory 420, a baseband processor 430, a radio frequency (RF) module 440, and an antenna module 450. Also shown is a bus 422 that may be operable to communicate data and/or control information between the processor 410, the memory 420, the baseband processor 430, the RF module 440, and the antenna module 450. The bus 212 may be operable to communicate with another component of the device 400 to transfer data and/or control information. The device 400 may correspond to any one of the devices 110, 120, 130, and 140 described above with respect to FIGS. 1A and 1B.

The processor 410 may comprise suitable logic, circuitry, code, and/or interfaces that may be operable to control, configure, and/or manage the memory 420, the baseband processor 430, the RF module 440, and the antenna module 450. The memory 420 may comprise suitable logic, circuitry, code, and/or interfaces that may be operable to store information associated with the operation of the device 400.

The baseband processor 430 may comprise suitable logic, circuitry, code, and/or interfaces that may be operable to process baseband information. The baseband information may comprise data, networking information, protocol information, and/or other like information, and may be received through signals provided by the RF module 440, the processor 410, the memory 420, and/or through the bus 412. The baseband processor 430 may be operable to support various types of wireless communication technologies that utilize multiple antennas. For example, the baseband processor 430 may support WiGig and/or Wi-Fi communication technologies.

The RF module 440 may comprise suitable logic, circuitry, code, and/or interfaces that may be operable to provide up-conversion and other associated operations of baseband signals provided by the baseband processor 430 to RF signals for wireless transmission. The RF module 440 may also be operable to provide down-conversion and other associated operations of received RF signals to baseband signals that are communicated to the baseband processor 430 for further processing. The RF module 440 may comprise one or more power amplifiers (PAs) (not shown) that may be utilized to amplify signals prior to wireless transmission through the antenna module 450. The RF module 440 may be operable to support various types of wireless communication technologies, including but not limited to WiGig and/or Wi-Fi communication technologies.

The antenna module 450 may comprise a plurality of antennas, such as an antenna array, for example. In some embodiments of the invention, some or all of the antennas in the antenna module 450 may be transmit/receive (Tx/Rx) antennas. In some embodiments of the invention, some of the antennas in the antenna module 450 may be receive (Rx) only antennas while others may be transmit (Tx) only antennas. The antenna module 450 may be operable to mechanically rotate some or all of the plurality of antennas in a particular direction.

The processor 410, the baseband processor 430, the RF module 440, and/or the antenna module 450 may be operable to generate transmitted signals with a directional spatial resolution or spatial selectivity that is obtained based on beamforming signal processing operations and/or mechanical rotation of antennas in the antenna module 450. The processor 410, the baseband processor 430, the RF module 440, and/or the antenna module 450 may be operable to detect a direction of arrival of certain signals by utilizing techniques such as virtual antenna calculations, for example. The processor 410, the baseband processor 430, the RF module 440, and/or the antenna module 450 may be operable to select an initiator device from multiple initiator devices for establishing an anonymous directional peer-to-peer wireless communication link.

In operation, the device 400 may be utilized as an initiator device or as a recipient device as described above with respect to FIGS. 1A-3B. When the device 400 is utilized as an initiator device, the device 400 may generate and transmit signals such as the signals 112, 212, 322, 332, and 342 described above. In this regard, the baseband processor 430, the RF module 440, and the antenna module 450 may be utilized to generate the appropriate signals to initiate the handshaking operations for establishing an anonymous directional peer-to-peer wireless communication link.

When the device 400 is utilized as a recipient device, the device 400 may generate and transmit signals such as the signals 122, 244, and 312 described above. In this regard, the baseband processor 430, the RF module 440, and the antenna module 450 may be utilized to generate the appropriate signals to continue with the handshaking operations for establishing an anonymous directional peer-to-peer wireless communication link. When more than one initiator device is detected by the device 400, the device 400 may be operable to present to a user the various initiator devices so that one of them may be selected for association.

The device 400 may support the sweeping mechanism described above with respect to FIGS. 2A-2C based on operations at the Media Access Control (MAC) layer of the Open System Interconnection (OSI) model. The MAC layer operations supported by the device 400 may utilize the directional spatial resolution or spatial selectivity that can be obtained by beamforming signal processing operations to perform Carrier Sense Multiple Access for Collision Avoidance (CSMA/CA) to enable communication with more than one device.

The device 400 may implement the directional spatial resolution or spatial selectivity by performing beamforming signal processing operations at the Physical layer of the OSI model. In this regard, the device 400 may enable communication and data transfer without the need of a wireless LAN or a cellular network. Moreover, the device 400 may support a maximum communication link range of approximately 30 meters to 60 meters. Also, the device 400 may enable secure one-to-one communication by supporting encryption operations. At the Network layer of the OSI model, the device 400 may be utilized across a delay tolerant network when packets are enumerated.

The device 400 may be utilized in a plurality of scenarios such as those described above with respect to FIGS. 1A-3B. In yet another example, the device 400 may be utilized by a user to establish a directional anonymous peer-to-peer wireless communication link with an automatic teller machine (ATM) device in a public vestibule. The connection may be a secure connection by using encryption operations on the data transfer. The encryption operations may include, but need not be limited to, operations associated with Data Encryption Standard (DES), Triple DES, Advanced Encryption Standard (AES), and/or other like encryption mechanism. The encryption operations may be supported by one or more of the components of the device 400. In this scenario, the user of the device 400 may perform secure transactions with the ATM device by simply pointing the device 400 in the direction of the ATM device and establishing a secure connection with the ATM device.

Figure 5A:
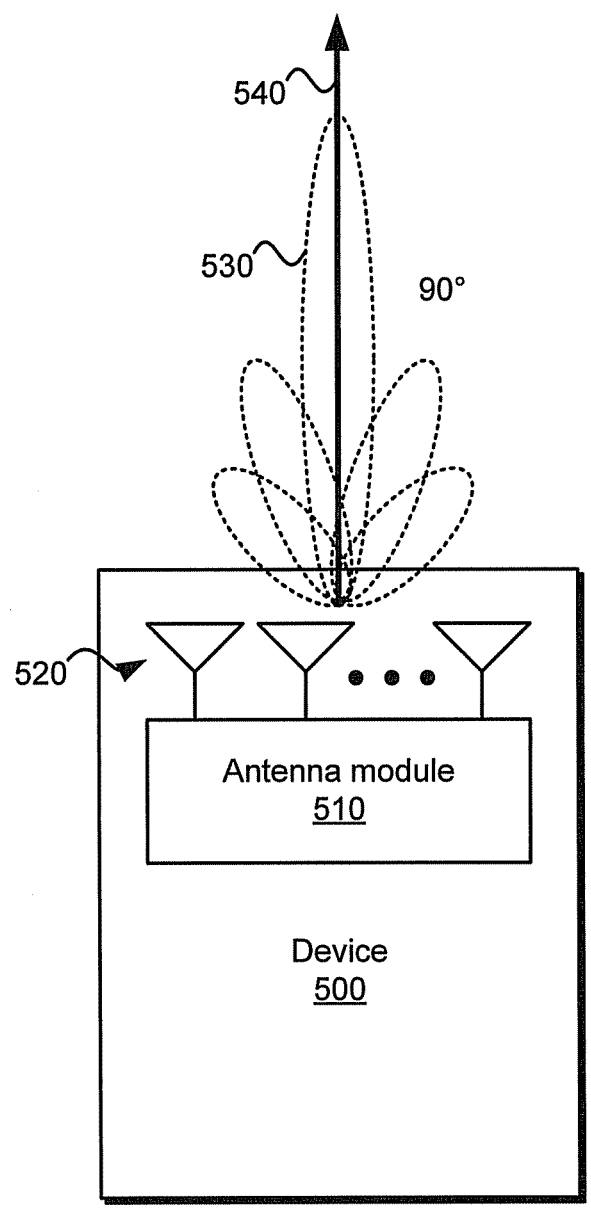
FIGS. 5A-5C are diagrams, each of which illustrates directional resolution through multiple antenna beamforming, in accordance with an embodiment of the invention.
Figure 5B:
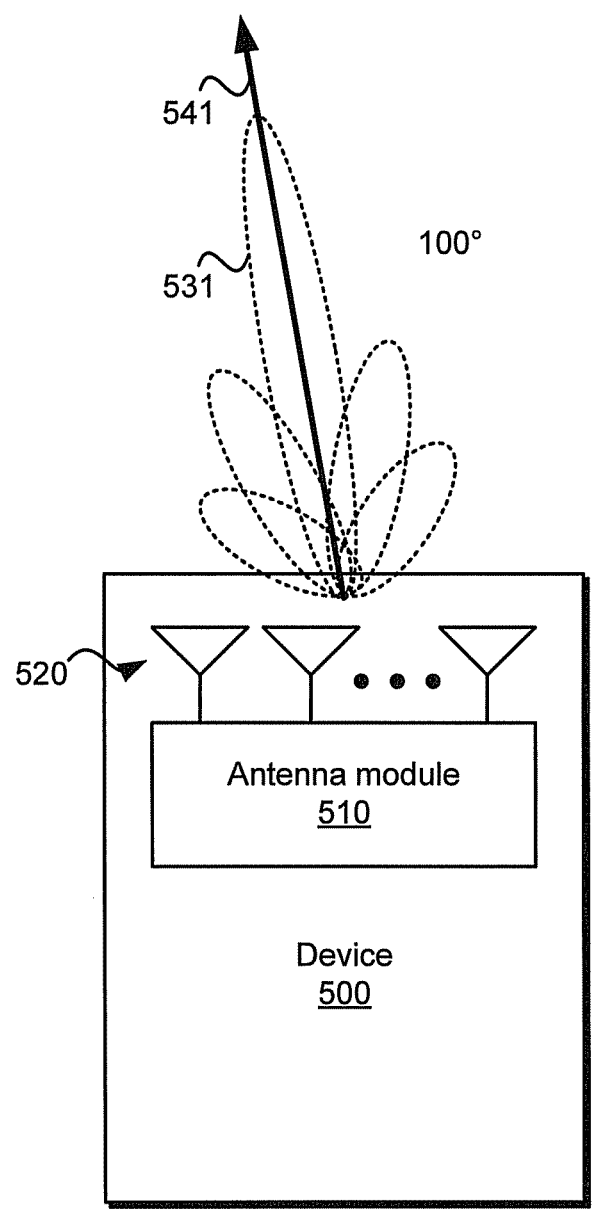
Figure 5C:
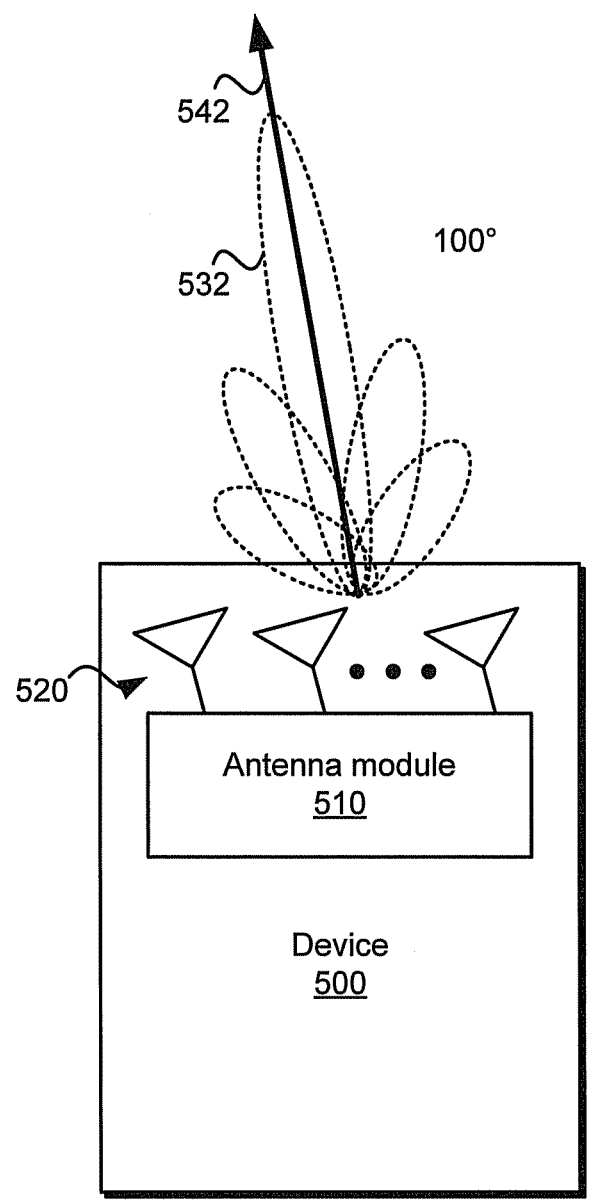

FIGS. 5A-5C are diagrams, each of which illustrates illustrate directional resolution through multiple antenna beamforming, in accordance with an embodiment of the invention. Referring to FIG. 5A, there is shown a device 500 that may correspond to the device 400 described above with respect to FIG. 4. The device 500 may comprise an antenna module 510 that has a plurality of transmit antennas 520. The antenna module 510 may be substantially similar to the antenna module 450 described above. As shown in FIG. 4, the device 500 may directionally transmit signals 540 along the direction of a main lobe 530 produced by the transmit antennas 520. The directional spatial resolution or spatial selectivity of the main lobe 530 may be controlled by the various weights applied to the transmit antennas 520 by the beamforming signal processing operations performed by the device 500.

In operation, the device 500 may compute one or more weights that are applied to the transmit antennas 520 so that signals at a particular angle or direction experience constructive interference while at other angles or directions the signals experience destructive interference. In the example shown in FIG. 5A, the direction along the longitudinal axis of the main lobe 530 corresponds to the angle or direction of constructive interference resulting in the signals 540 being transmitted at a 90 degree angle from the transmit antennas 520.

Referring to FIG. 5B, in operation, the device 500 may modify one or more weights that are applied to the transmit antennas 520 so that the signals 541 may be transmitted at a different angle or direction than the signals 540 in FIG. 5A. In the example shown in FIG. 5B, the direction along the longitudinal axis of the main lobe 531 is such that the signals 541 are being transmitted at a 100 degree angle from the transmit antennas 520.

Referring to FIG. 5C, in operation, the device 500 may maintain the same weight as applied in FIG. 5A to achieve the same directional spatial resolution but may mechanically rotate the transmit antennas 520 so that the signals 542 may be transmitted at a different angle or direction than the signals 540 in FIG. 5A. In the example shown in FIG. 5C, the direction along the longitudinal axis of the main lobe 532 is such that the signals 542 are being transmitted at a 100 degree angle from the transmit antennas 520, the same angle as in FIG. 5B.

The operations described with respect to FIGS. 5A-5C are intended for purposes of illustration and not of limitation. Different angles or directions than those described may be achieved utilizing beamforming signal processing operations and/or mechanical rotation. In some embodiments, up to 360 degrees of mechanical rotation with various resolutions may be supported by the device 500 through the antenna module 510. For example, resolutions of less than one degree, one degree, two degrees, five degrees, 10 degrees, 20 degrees, 22.5 degrees, 30 degrees, or a combination thereof may be supported. Moreover, the operations described with respect to FIGS. 5A-5C may also be applicable for the reception of signals and may be utilized to detect the direction of arrival of a certain signals.

Figure 6:
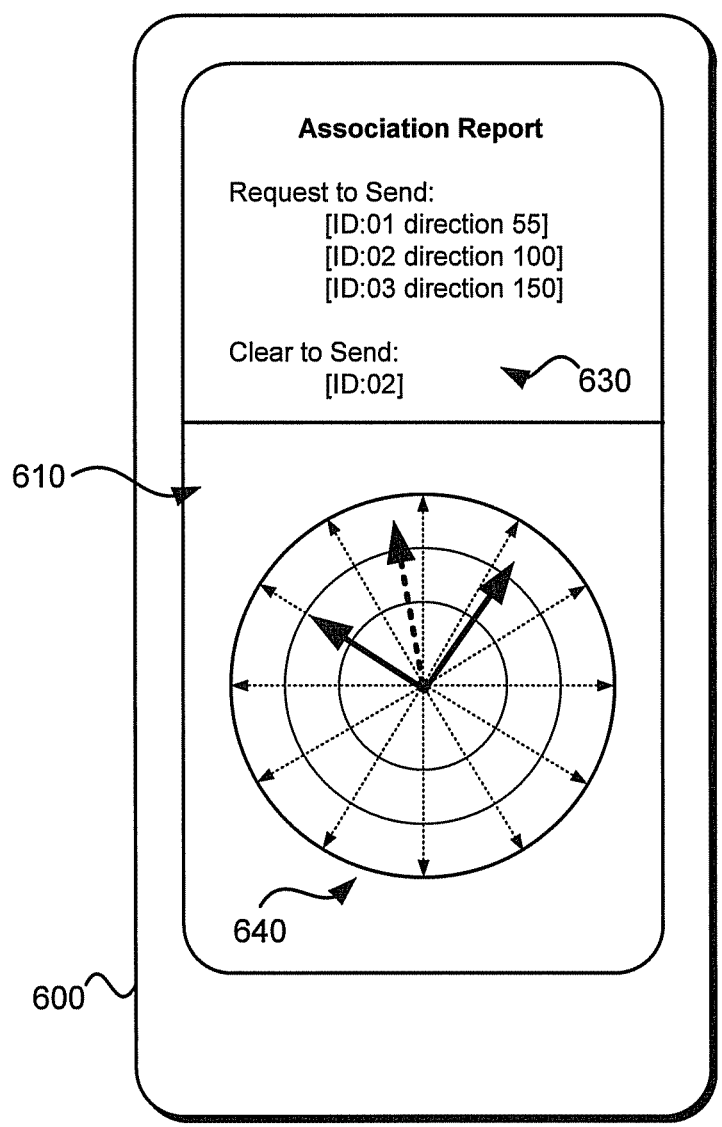
FIG. 6 is a diagram that illustrates a presentation of an exemplary association report, in accordance with an embodiment of the invention.

FIG. 6 is a diagram that illustrates a presentation of an exemplary association report, in accordance with an embodiment of the invention. Referring to FIG. 6, there is shown a device 600 that may correspond to any one of the device 110, 120, 130, 140, 400, and 500 described above. The device 600 may comprise a display portion 610 on which an association report may be presented. In this example, the display portion 610 is split into a textual portion 630 and a graphical portion 640.

In operation, the textual portion 630 may indicate the association IDs of those devices that have sent requests for establishing communication with the device 600. As shown in FIG. 6, three devices, ID:01, ID:02, and ID:03 have sent requests to the device 600. The direction or angle for each of the devices is also shown with ID:01 being at 50 degrees from the device 600, ID:02 being at 100 degrees from the device 600, and ID:03 being at 150 degrees from the device 600. Also shown in the textual portion, is the association ID of the device with which the device 600 is to establish or has established an anonymous directional peer-to-peer wireless communication link. In this example, ID:02 corresponds to the device with which the device 600 is to establish or has established a communication link.

The graphical portion 640 illustrates the same information shown in the textual portion 630 by using three arrows that correspond to ID:01, ID:02, and ID:03. The arrows point along a 50 degree angle, a 100 degree angle, and a 150 degree angle, with the longest arrow representing the strongest signal reception being the arrow pointing along the 100 degree angle. That arrow is shown in dashed lines to indicate that the corresponding device is the one with which the device 600 is to establish or has established an anonymous directional peer-to-peer wireless communication link.

When more than one initiator device can be used to communicate with the device 600, the display portion 610 and/or some other portion of the device 600 may be utilized to enable a user to provide an input that the device 600 may utilize to select one or more of the initiator devices for establishing an anonymous directional peer-to-peer wireless communication link.

The device 600 may also be an initiator device and the display 600 may be utilized to graphically and/or textually present information regarding possible recipient devices. The information regarding possible recipient devices, which may comprise direction information, may be based on beacon signals transmitted by the recipient devices.

Figure 7:
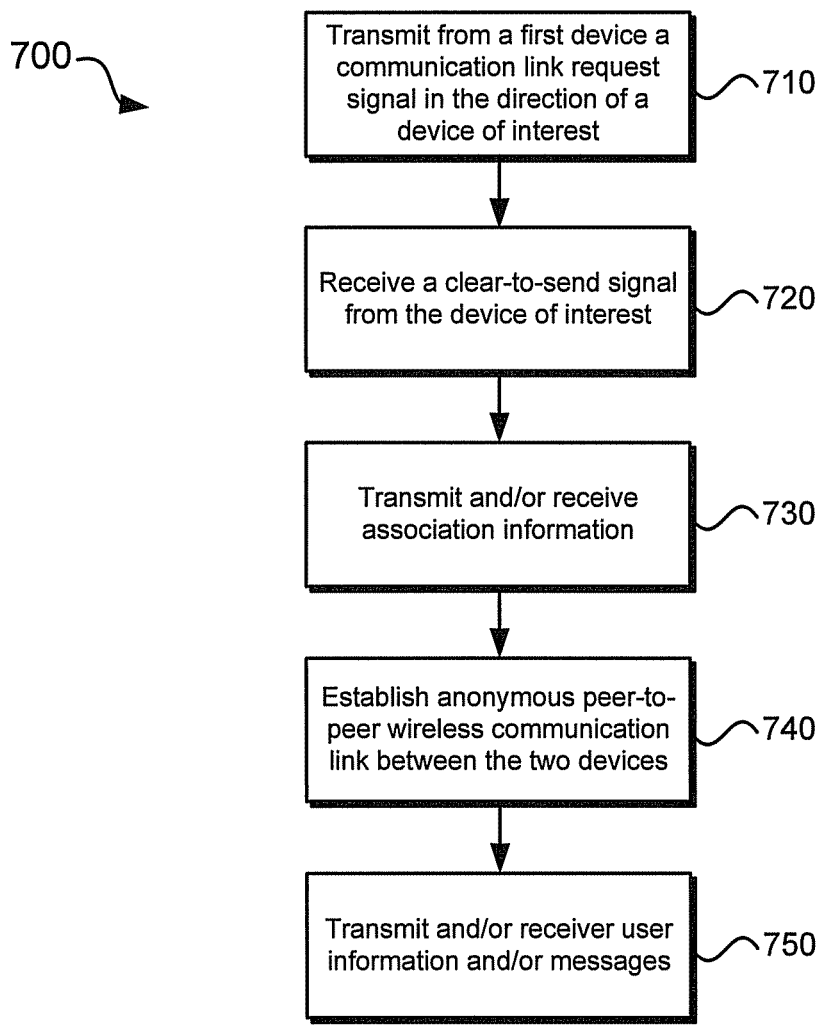
FIGS. 7 and 8 are flow diagrams, each of which illustrates examples of operations associated with establishing an anonymous directional peer-to-peer wireless communication link, in accordance with embodiments of the invention.
Figure 8:
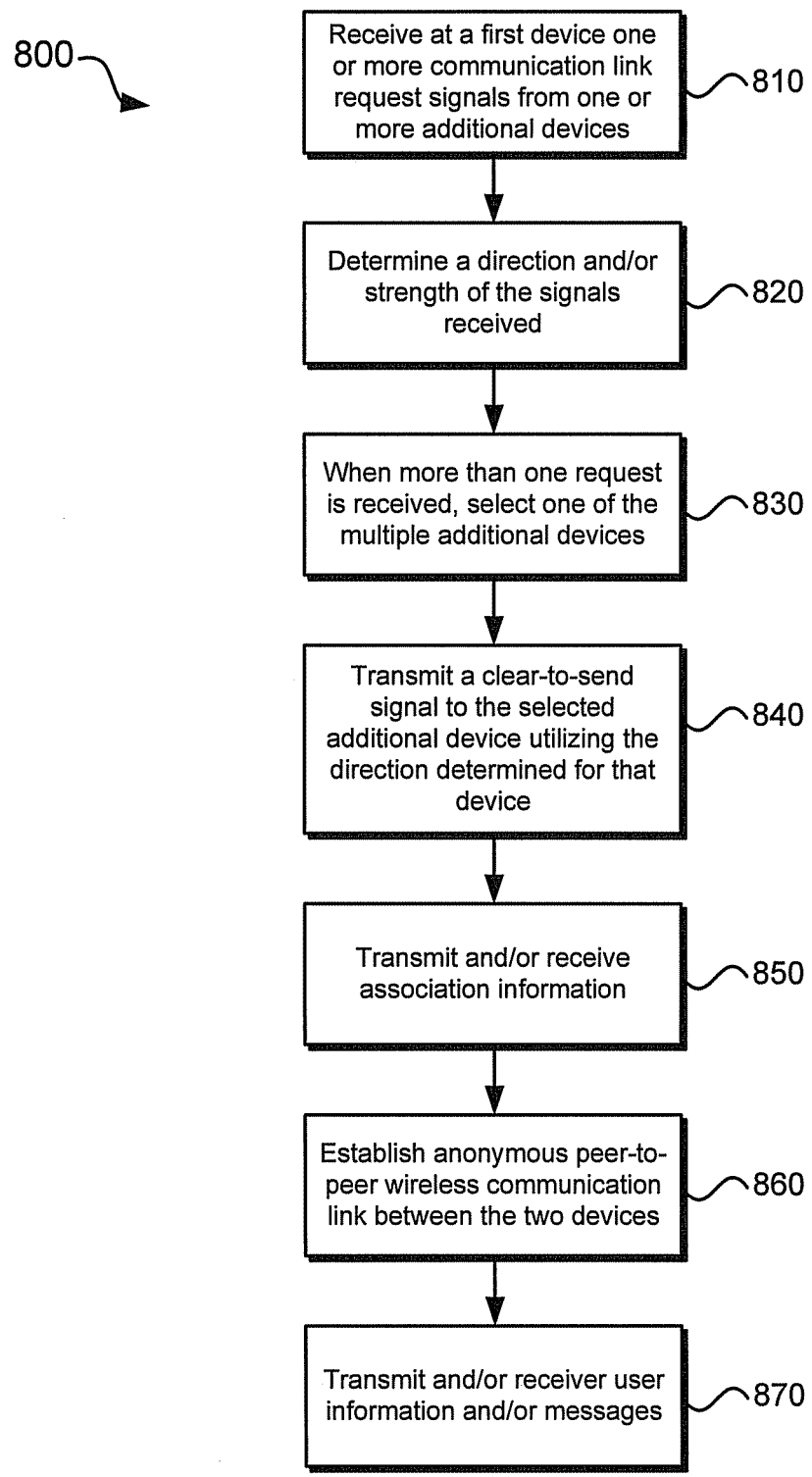

FIGS. 7 and 8 are flow diagrams, each of which illustrates examples of operations associated with establishing an anonymous directional peer-to-peer wireless communication link, in accordance with embodiments of the invention. Referring to FIG. 7, there is shown a flow chart 700 in which, at step 710, a first device, such as an initiator device, may transmit a communication link request in the direction of a device of interest, such as a recipient device. At step 720, the first device may receive, from the device of interest, an indication that is clear to send information to continue handshaking operations in order to associate the first device with the device of interest. At step 730, the association information, such as an association ID, for example, may be transmitted and/or received by the devices. At 740, once the association is completed, the anonymous directional peer-to-peer wireless communication link may be established between the first device and the device of interest. At 750, messages, profile information, and/or other type of information may be communicated from one device to the other.

Referring to FIG. 8, there is shown a flow chart 800 in which, at step 810, a first device, such as a recipient device, may receive one or more communication link requests from one or more additional devices, such as initiator devices. At step 820, the first device may determine or detect a direction of arrival of the received signals and/or the strength of the received signals. At step 830, when more than one additional device sends communication link requests to the first device, the first device may select one of the additional devices for establishing an anonymous directional peer-to-peer wireless communication link. At step 840, the first device may transmit an indication that is clear to send information to continue handshaking operation in order to associate the first device with the selected additional device. The indication may be transmitted in accordance with the direction determined at step 820 for the selected additional device. At step 850, the association information, such as an association ID, for example, may be transmitted and/or received by the devices. At 860, once the association is completed, the anonymous directional peer-to-peer wireless communication link may be established between the first device and the selected additional device. At 870, messages, profile information, and/or other type of information may be communicated from one device to the other.

Certain aspects of the disclosure may comprise one or more circuits in a first device that are operable to directionally transmit one or more signals to a second device utilizing beamforming on a plurality of antennas. Each of the first device and the second device may be one of the devices 110, 120, 130, 140, 400, 500, and 600 described above, for example. The first device may be operable to receive, in response to the directionally-transmitted one or more signals, one or more signals from the second device to establish an anonymous directional peer-to-peer wireless communication link with the second device by directional association of the first device and the second device. The communication link may be one of the links 150, 250, and 350 described above, for example. The directionally-transmitted one or more signals, such as the signals 112, 212, 322, 332, and 342, for example, may comprise an RTS signal and/or an association ID corresponding to the first device. The received one or more signals, such as the signals 122, 244, and 312, for example, may comprise a CTS signal. The one or more circuits may be operable to adjust the direction in which the directionally-transmitted one or more signals are transmitted by controlling a rotation of the plurality of antennas. In this regard, an antenna module, such as the antenna modules 450 and 510, for example, may be operated to mechanically rotate the antennas transmit signals in a particular direction or angle. The one or more circuits may be operable to receive, when the anonymous directional peer-to-peer wireless communication link is established, information associated with a profile of a user of the second device.

Other aspects of the disclosure may comprise one or more circuits in a first device that are operable to receive one or more signals from one or more additional devices requesting that an anonymous directional peer-to-peer wireless communication link be established. Each of the first device and the additional devices may be one of the devices 110, 120, 130, 140, 400, 500, and 600 described above, for example. The one or more received signals may correspond to, for example, the signals 112, 212, 322, 332, and 342 described above and may comprise an RTS signal. The first device may determine a direction associated with each of the one or more additional devices and may transmit one or more signals in the direction of one of the one or more additional devices to establish the anonymous directional peer-to-peer wireless communication link with that additional device. The one or more transmitted signals may correspond to, for example, the signals 122, 244, and 312 described above and may comprise a CTS signal. The one or more circuits may be operable to receive an input to select the one additional device with which the anonymous directional peer-to-peer wireless communication link is established. The one or more circuits are operable to transmit one or more beacon signals, such as the signals 242, for example, to indicate the location of the first device. The one or more circuits may be operable to sweep through a plurality of spatial segments with the one or more beacon signals as illustrated above with respect to FIGS. 2A-2C.

While some of the examples described above make reference to the use of RTS and CTS signals during the association or pairing process to establish an anonymous directional peer-to-peer wireless communication link, the invention need not be so limited. Other handshaking operations and/or signals, which may be different from those described above, can also be utilized.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for anonymous directional peer-to-peer wireless communication.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   directionally transmitting, by a first device, one or more signals utilizing beamforming on a plurality of antennas, the directionally transmitted one or more signals comprising at least one of a request-to-send (RTS) and clear-to-send (CTS) signal;
   receiving, in response to the directionally-transmitted one or more signals, one or more communication link request signals from a plurality of devices, the received one or more communication link request signals comprising at least one of a request-to-send (RTS) and clear-to-send (CTS) signal;
   determining at least one of a direction and strength of the one or more communication link request signals;
   selecting a second device from among the plurality of devices based on the determining;
   receiving association data from the second device in a beamforming direction determined for the second device; and
   establishing an anonymous directional peer-to-peer wireless communication link with the second device by directional association between the first device and the second device.

2. The method of claim 1, comprising adjusting the direction in which the directionally transmitted one or more signals are transmitted by rotating the plurality of antennas.

3. The method of claim 1, wherein the directionally transmitted one or more signals comprise an association identification (ID) corresponding to the first device.

4. The method of claim 1, comprising receiving, when the anonymous directional peer-to-peer wireless communication link is established, and information associated with a profile of a user of the second device.

5. A method, comprising:
   receiving, by a first device, one or more signals from one or more additional devices requesting that an anonymous directional peer-to-peer wireless communication link be established, the received one or more signals comprising at least one of a request-to-send (RTS) and clear-to-send (CTS) signal;
   determining a direction associated with each of the one or more additional devices;
   selecting an additional device from among the one or more additional devices based on the determining;
   transmitting one or more signals in the direction of the selected additional device, the transmitted one or more signals comprising at least one of a request-to-send (RTS) and clear-to-send (CTS) signal;
   receiving association data from the selected additional device in the direction of the selected additional device; and
   establishing the anonymous directional peer-to-peer wireless communication link with the selected additional device by directional association between the first device and the selected additional device.

6. The method of claim 5, comprising:
   presenting the directions associated with each of the one or more additional devices; and
   receiving an input to select the selected additional device after the presenting.

7. The method of claim 5, comprising transmitting one or more beacon signals to indicate a location of the first device.

8. The method of claim 7, comprising sweeping through a plurality of spatial segments with the one or more beacon signals.

9. A system, comprising:
   one or more circuits in a first device that are operable to:
   directionally transmit one or more signals utilizing beamforming on a plurality of antennas, the directionally transmitted one or more signals comprising at least one of a request-to-send (RTS) and clear-to-send (CTS) signal; receive, in response to the directionally-transmitted one or more signals, one or more communication link request signals from a plurality of devices, the received one or more communication link request signals comprising at least one of a request-to-send (RTS) and clear-to-send (CTS) signal;

determine at least one of a direction and strength of the one or more communication link request signals;

select a second device from among the plurality of devices based on the determining;

receive association data from the second device in a beamforming direction determined for the second device; and establish an anonymous directional peer-to-peer wireless communication link with the second device by directional association between the first device and the second device.

10. The system of claim 9, wherein the one or more circuits are operable to adjust the direction in which the directionally transmitted one or more signals are transmitted by controlling a rotation of the plurality of antennas.

11. The system of claim 9, wherein the directionally transmitted one or more signals comprise an association identification (ID) corresponding to the first device.

12. The system of claim 9, wherein the one or more circuits are operable to receive, when the anonymous directional peer-to-peer wireless communication link is established, and information associated with a profile of a user of the second device.

13. A system, comprising:
one or more circuits in a first device that are operable to:
receive one or more signals from one or more additional devices requesting that an anonymous directional peer-to-peer wireless communication link be established, the received one or more signals comprising at least one of a request-to-send (RTS) and clear-to-send (CTS) signal;

determine a direction associated with each of the one or more additional devices;

select an additional device from among the one or more additional devices based on the determining;

transmit one or more signals in the direction of one of the selected additional device, the transmitted one or more signals comprising at least one of a request-to-send (RTS) and clear-to-send (CTS) signal;

receive association data from the selected additional device in the direction of the selected additional device; and establish the anonymous directional peer-to-peer wireless communication link with the selected additional device by directional association between the first device and the selected additional device.

14. The system of claim 13, wherein the one or more circuits are operable to:
present the directions associated with each of the one or more additional devices; and
receive an input to select the selected additional device after the directions are presented.

15. The system of claim 13, wherein the one or more circuits are operable to transmit one or more beacon signals to indicate the location of the first device.

16. The system of claim 15, wherein the one or more circuits are operable to sweep through a plurality of spatial segments with the one or more beacon signals.

17. The method of claim 1, comprising: determining a direction and signal strength associated with the one or more signals from the second device; and presenting the directional association between the first device and the second device based on the direction and signal strength associated with the one or more signals from the second device.

* * * * *